United States Patent
Nedorezov et al.

(10) Patent No.: US 8,814,736 B2
(45) Date of Patent: Aug. 26, 2014

(54) PRE-STAGING AND BOOSTING FOR DOWNSHIFTS TO INCREASE REGENERATIVE BRAKING

(75) Inventors: Felix Nedorezov, Rochester Hills, MI (US); Hong Jiang, Birmingham, MI (US); Matthew John Shelton, Grosse Ile, MI (US); Zhengyu Dai, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 316 days.

(21) Appl. No.: 13/465,654

(22) Filed: May 7, 2012

(65) Prior Publication Data
US 2013/0292223 A1  Nov. 7, 2013

(51) Int. Cl.
*F16H 3/72* (2006.01)
*F16H 37/06* (2006.01)

(52) U.S. Cl.
USPC .................................................. 475/5

(58) Field of Classification Search
USPC ......... 477/3–5, 9, 21, 71, 75, 92, 94, 95, 144, 477/156, 162, 170, 182, 187; 180/165.275, 180/65.285, 65.31; 903/906, 907, 909, 930, 903/945, 947
See application file for complete search history.

(56) References Cited

U.S. PATENT DOCUMENTS

| | | | |
|---|---|---|---|
| 8,690,725 B2 * | 4/2014 | Nedorezov et al. | 477/5 |
| 2010/0191400 A1 | 7/2010 | Ajiro | |
| 2011/0093174 A1 | 4/2011 | O'Leary et al. | |
| 2011/0172862 A1 | 7/2011 | Ortmann et al. | |

\* cited by examiner

*Primary Examiner* — Justin Holmes
(74) *Attorney, Agent, or Firm* — David B. Kelley; Brooks Kushman P.C.

(57) ABSTRACT

A hybrid vehicle has a battery, a regenerative braking system, a transmission, and a controller. The controller boosts and strokes a hydraulic cylinder of an on-coming clutch when the state-of-charge of the battery allows regenerative braking and in response to a pedal actuation. The controller boosts and strokes the hydraulic cylinder before a disconnect clutch is opened and the transmission is downshifted to increase regenerative braking efficiency.

18 Claims, 4 Drawing Sheets

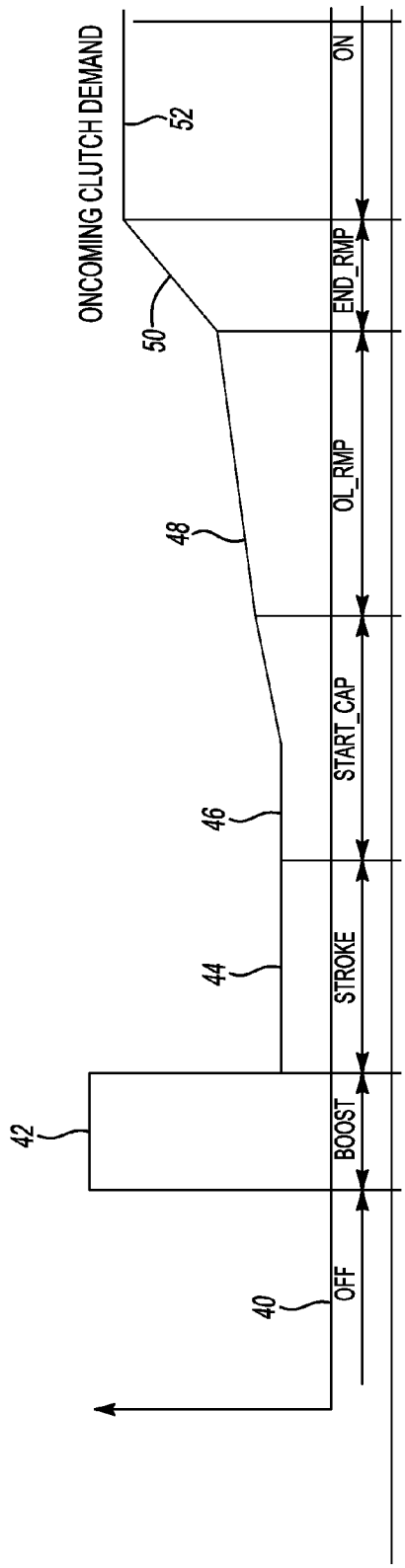

PRE-STAGING AND BOOSTING FOR DOWNSHIFTS TO INCREASE REGENERATIVE BRAKING

TECHNICAL FIELD

This disclosure relates to an automatic transmission downshifting strategy for increasing regenerative braking time.

BACKGROUND

Vehicle manufacturers are developing hybrid vehicles to meet the demand for more fuel efficient vehicles. One configuration for a hybrid vehicle may be referred to as a Modular Hybrid Transmission (MHT) vehicle design. In a MHT vehicle, an electric machine is sandwiched between a conventional automatic step ratio transmission and the engine. The electric machine is attached to the transmission impeller or input shaft. The engine is selectively disconnected from the transmission using a disconnect clutch. The disconnect clutch allows the vehicle to be driven under electric power alone, in hybrid mode with both the electric machine and the engine propelling the vehicle, or in a combustion engine only mode in which the vehicle is propelled by the engine only.

Regenerative braking provides an approach to increasing the range and fuel economy in MHT vehicles. Kinetic energy of the vehicle is converted to electricity used to charge a high voltage battery using an e-machine as a brake and a generator. Since regenerative brake efficiency drops off at lower speeds, a multi-speed geared automatic transmission of the MHT system is downshifted to increase the e-machine speed and increase the available torque and efficiency. The time required to downshift the MHT system reduces the time available to generate electricity by regenerative braking because maintaining acceptable shift quality requires a significant reduction of regenerative braking.

This disclosure is directed to the problem of improving regenerative braking efficiency and other problems as summarized below.

SUMMARY

According to one aspect of this disclosure, a hybrid vehicle is provided that has a battery, a regenerative braking system, a transmission, and a controller. The transmission has a plurality of gears that are linked by a plurality of clutches that are each engaged and disengaged by a hydraulic cylinder. The controller boosts and strokes the hydraulic cylinder of an on-coming clutch when the state-of-charge of the battery allows regenerative braking and a pedal is actuated. The controller boosts and strokes the hydraulic cylinder before a disconnect clutch is opened and the transmission is downshifted.

According to other aspects of the disclosed vehicle, the pedal may be an accelerator pedal that is actuated by releasing the accelerator pedal. A reduced level of hydraulic pressure is provided to a hydraulic cylinder of an off-going clutch. The controller preferably may select a downshifted gear combination that is a direct shift from a current gear combination.

Three different control strategies may be followed if instead of applying the brakes to start regenerative braking the driver tips in by depressing the accelerator pedal. According to a first strategy, the downshift may be completed if based upon the vehicle speed the desired gear combination is the same as the downshifted gear combination. Following a second strategy, the stroke pressure of the on-coming clutch may be reduced and the stroke pressure of the off-going clutch is increased to return to an original gear combination. According to the third strategy, the stroke pressure of the on-coming clutch may be reduced, the stroke pressure of the off-going clutch may be increased, and an alternative gear combination is boosted and stroked to return to shift to the alternate gear combination based upon the vehicle speed the desired gear combination.

Another aspect of this disclosure relates to a method of controlling the transmission of a hybrid vehicle having a battery, a regenerative braking system, and a transmission having a plurality of gears that are linked by a plurality of clutches that are each engaged and disengaged by a hydraulic cylinder, and a controller. According to the method, the controller boosts and strokes the hydraulic cylinder of an on-coming clutch when a state-of-charge of the battery allows regenerative braking and an accelerator pedal is actuated. The hydraulic cylinder is boosted and stroked before a disconnect clutch is opened and the transmission is downshifted.

According to other aspects of the method, the hydraulic pressure provided to a hydraulic cylinder of an off-going clutch is reduced. The controller may select a downshifted gear combination that is a direct shift from a current gear combination. After the pedal is actuated by releasing the pedal and a brake is not applied, and based upon a vehicle speed, if the desired gear combination is the same as the downshifted gear combination, the downshift may be completed. If the desired gear combination does not require a downshift, the method may further comprise reducing the stroke pressure of the on-coming clutch and increasing a stroke pressure of the off-going clutch to return to an original gear combination. If the desired gear combination requires a downshift to an alternate gear combination, the method may further comprise reducing the stroke pressure of the on-coming clutch, increasing a stroke pressure of the off-going clutch, and boosting and stroking the alternative gear combination before shifting to the alternate gear combination.

According to another aspect of this disclosure as it relates to a system for downshifting a transmission, a battery, a regenerative braking system, a multi-step automatic transmission, and a controller are provided. The transmission has a plurality of gears that are linked by a plurality of clutches that are each engaged and disengaged by a hydraulic cylinder. The controller boosts and strokes the hydraulic cylinder of an on-coming clutch when a state-of-charge of the battery allows regenerative braking and a pedal is actuated. The hydraulic cylinder is boosted and stroked before a disconnect clutch is opened and the transmission is downshifted.

According to other aspects of the disclosure as it relates to the system, the pedal may be an accelerator pedal that is actuated by releasing the accelerator pedal. A hydraulic cylinder of an off-going clutch may be provided with a reduced level of hydraulic pressure. The controller may select a downshifted gear combination that is a direct (synchronous) shift from a current gear combination.

BRIEF DESCRIPTION OF THE DRAWINGS

FIG. 2 is a chart showing one example of an on-coming clutch pressure profile;

FIG. 4 is one example of a clutch element application chart; and

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the present invention.

Figure 1A:
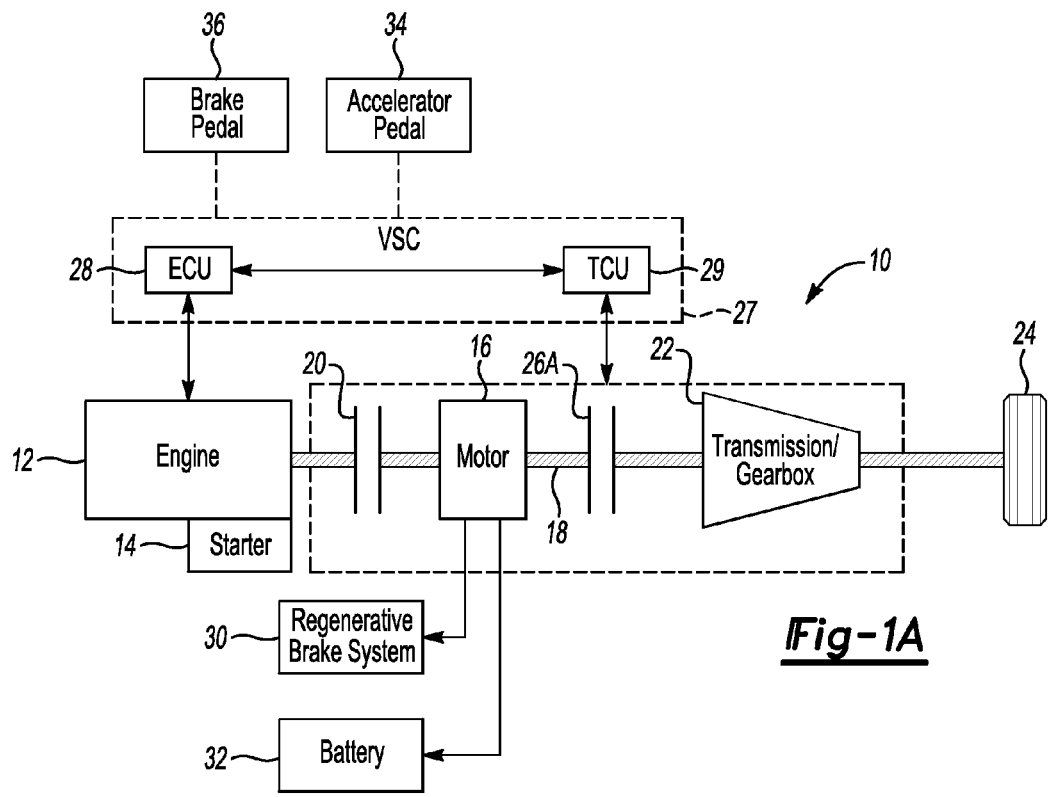
FIG. 1A is a diagrammatic view of a transmission system for a hybrid vehicle that does not include a torque converter.
Figure 1B:
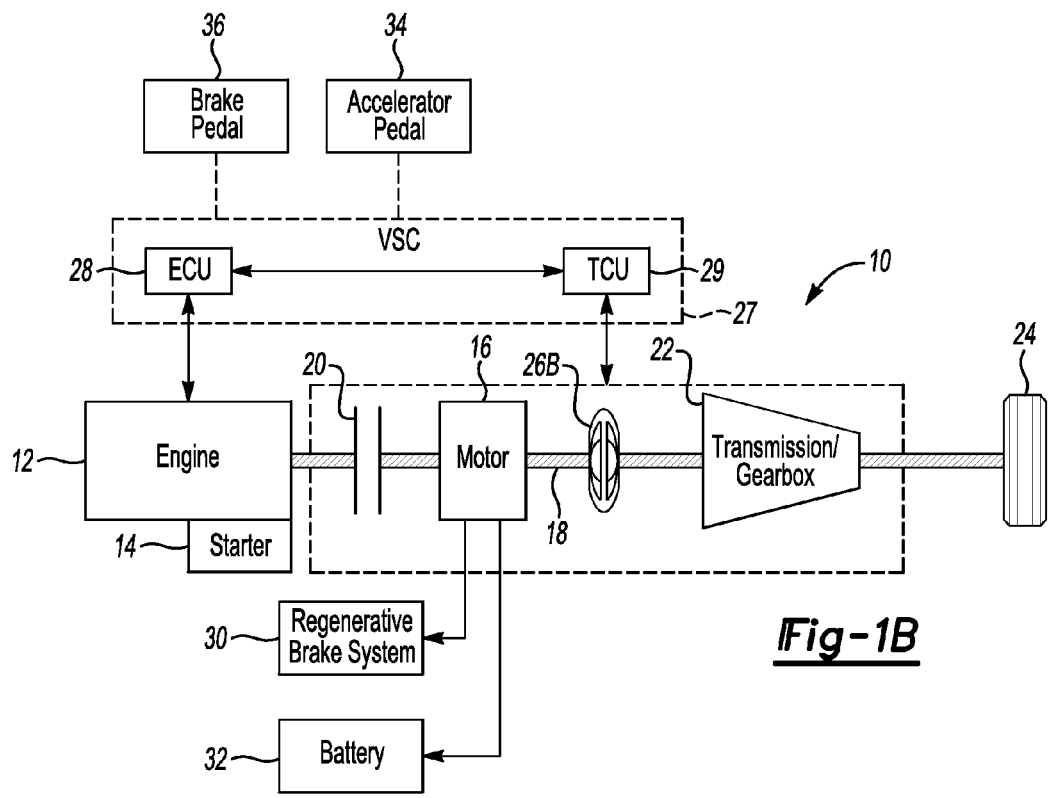
FIG. 1B is a diagrammatic view of an alternative embodiment of a transmission system for a hybrid vehicle that includes a torque converter.

Referring to FIGS. 1A and 1B, a transmission system 10 is shown in a diagrammatic form. An engine 12 is operatively connected to a starter 14 that is used to start the engine 12 when additional torque is needed. A motor 16 is operatively connected to a driveline 18. A disconnect clutch 20 is provided on the driveline 18 between the engine 12 and the motor 16. A step shift geared automatic transmission 22, or gear box, is also provided on the driveline 18. Torque transmitted from the engine 12 and motor 16 is provided through the driveline 18 to the transmission 22 that provides torque to the wheels 24. As shown in FIG. 1A, launch clutch 26A is provided between the transmission 22 and the engine 12 and/or motor 16 to provide torque through the transmission 22 to the wheels 24. As shown in FIG. 1B, a torque converter 26B is provided between the transmission 22 and the engine 12 and/or motor 16 to provide torque through the transmission 22 to the wheels 24. While elimination of the torque converter is an advantage of the embodiment of FIG. 1A, the present disclosure is also advantageous in reducing vibrations in systems having a torque converter 26B like that shown in the embodiment of FIG. 1B.

The vehicle includes a vehicle system control (VSC) for controlling various vehicle systems and subsystems and is generally represented by block 27 in FIG. 1. The VSC 27 includes a plurality of interrelated algorithms which are distributed amongst a plurality of controllers within the vehicle. For example, the algorithms for controlling the MHT powertrain are distributed between an engine control unit (ECU) 28 and a transmission control unit (TCU) 29. The ECU 28 is electrically connected to the engine 12 for controlling the operation of the engine 12. The TCU 29 is electrically connected to and controls the motor 16 and the transmission 22. The ECU 28 and TCU 29 communicate with each other and other controllers (not shown) over a hardline vehicle connection using a common bus protocol (e.g., CAN), according to one or more embodiments. Although the illustrated embodiment depicts the VSC 27 functionality for controlling the MHT powertrain as being contained within two controllers (ECU 28 and TCU 29) other embodiments of the HEV include a single VSC controller or more than two controllers for controlling the MHT powertrain.

With continuing reference to FIGS. 1A and 1B, a regenerative braking system 30 is provided that converts kinetic energy of the vehicle into electricity that is used to recharge the battery 32. The battery 32 provides power to the e-machine that is used to propel the vehicle under certain circumstances.

The vehicle is operated by a driver who provides inputs to the modular hybrid transmission system generally by operation of an accelerator pedal 34 or a brake pedal 36.

Referring to FIG. 2, a pressure profile for an on-coming clutch for the transmission 22 is provided. The pressure profile begins with the clutch off and a pressure of zero, at 40. When the driver depresses the brake pedal in prior art systems, the hydraulic pressure provided to a hydraulic cylinder associated with a downshift gear is increased to the boost level, at 42, to fill the cylinder. By depressing the brake pedal, the driver also releases the disconnect clutch 20 that is operatively connected between the engine 12 and the motor 16. The cylinder is then stroked, at 44, to move the cylinder to the point of beginning engagement with the selected downshift gear. With the disconnect clutch released, the hydraulic cylinder associated with the selected downshift gear is provided with increasing hydraulic pressure in a start gap stage, at 46, that is followed by an OL stage, at 48, during which the hydraulic pressure increase at a slightly greater rate. An end ramp stage, at 50, is characterized by a further increased rate of increase of the hydraulic pressure that ends when the on-coming clutch is on, or fully engaged, at 52.

According to this disclosure, the same pressure profile as shown in FIG. 2 is followed but the system constantly monitors the state-of-charge of the battery 32. If the state-of-charge of the battery 32 is appropriate for charging by the regenerative braking system 30, when the driver tips out by releasing the accelerator pedal 36 the hydraulic pressure provided to a hydraulic cylinder associated with a downshift gear is increased to the boost level, at 42, to fill the cylinder. The cylinder is then stroked, at 44, to move the cylinder to the point of beginning engagement with the selected downshift gear. The cylinder at this point is fully boosted and stroked and ready to shift the selected downshift gear by engaging the on-coming clutch. At this stage the transmission 22 does not change its ratio but is prepared, or pre-staged for the downshift.

The brake pedal 36 is actuated and the disconnect clutch 20 is released to separate the engine 12 from the motor 16. The hydraulic pressure provided to the off-going clutch may be reduced at the same time to reduce the torque capacity while maintaining sufficient pressure to maintain the current gear ratio. The remaining pressure profile stages 46-52 proceed as previously described.

The downshift is completed only after when the disconnect clutch is commanded to open. If the brake pedal is depressed and the regenerative braking is permitted, regeneration can begin as soon as the downshift is completed. By pre-staging the hydraulic cylinder of the selected downshift gear, the duration of time between the beginning of the start gap stage 46 and the end of the end ramp stage 50 is the length of time to complete the downshift. Pre-staging reduces the time of the delay caused by downshifting to be reduced by the length of time required to boost and stroke the hydraulic cylinder of the selected downshift gear. By reducing the delay, the amount of time available for regenerative braking is increased each time regenerative braking is permitted by the state-of-charge of the battery 32. Increased regenerative braking time allows more kinetic energy to be recaptured.

Figure 3:
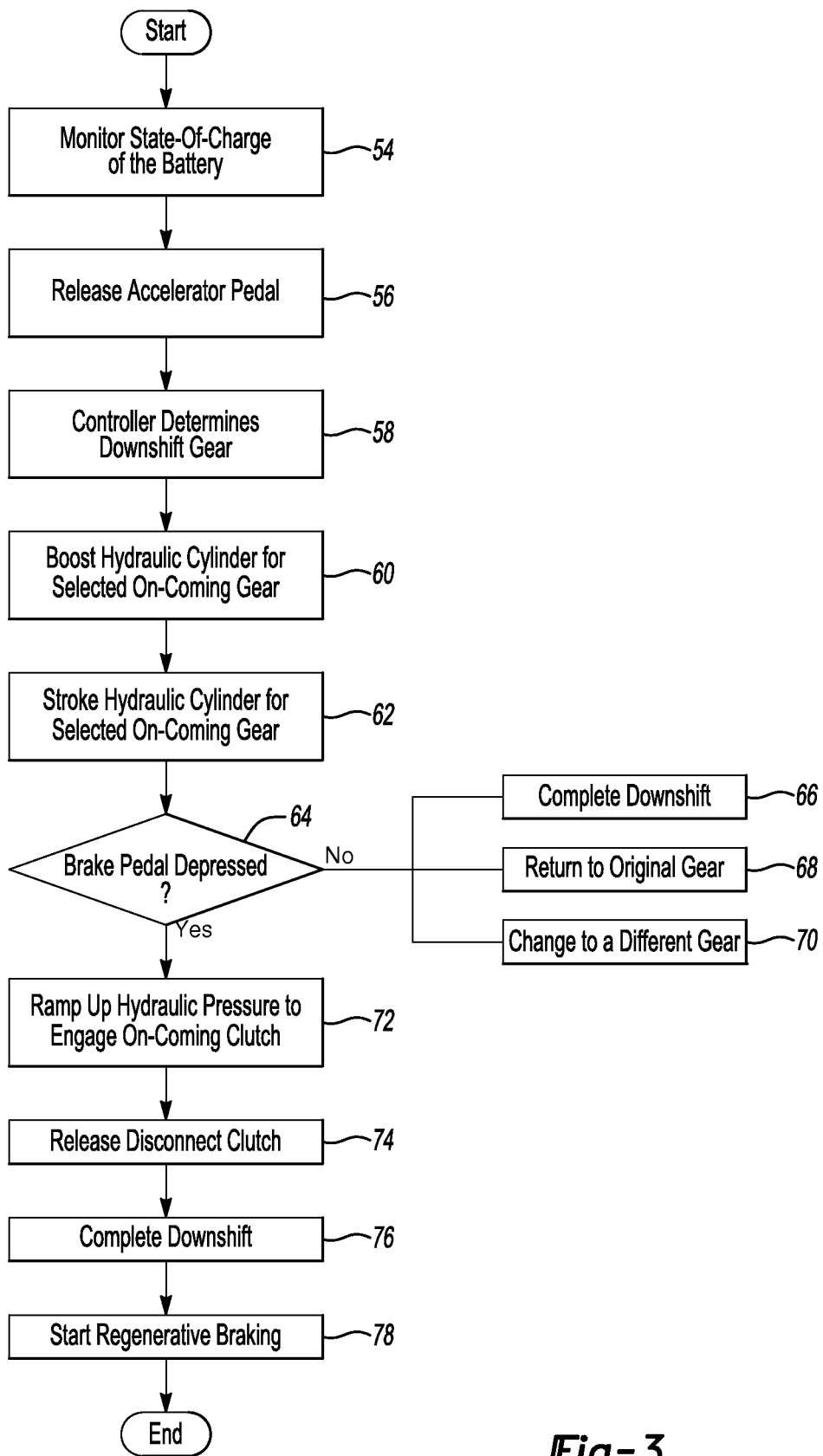
FIG. 3 is a flow chart of an algorithm of one example of a control strategy for increasing the efficiency of a regenerative braking system.

Referring to FIG. 3, one example of an algorithm for increasing the efficiency of a regenerative braking system is illustrated. The system monitors the state-of-charge of the battery constantly to determine whether the battery requires charging from the regenerative braking system, at 54. The process begins, at 56, by the driver releasing the accelerator pedal. The controller then determines, at 58, what downshift gear is appropriate based upon the speed of the vehicle and the availability of a "direct shift" from a higher gear ration to a lower gear ration with only one gear set being engaged and one gear set being disengaged. The system then boosts the hydraulic cylinder for the selected on-coming gear, at 60, and then strokes the same hydraulic cylinder, at 62.

At 64, the system determines whether the brake pedal is depressed. If the driver does not depress the brake but instead decides to tip-in on the accelerator pedal, the downshift process is stopped. At this point, three different control strategies may be followed. The downshift may be completed, at 66, if based upon the vehicle speed the desired gear combination is the same as the downshifted gear combination. The stroke pressure of the on-coming clutch may be reduced and the stroke pressure of the off-going clutch may be increased, at 68, to return to an original gear combination, if the vehicle speed is not substantially changed. The stroke pressure of the on-coming clutch may be reduced and the stroke pressure of the off-going clutch may be increased to shift to an alternative gear combination that is boosted and stroked to shift to the alternate gear combination, at 70, based upon the vehicle speed the desired gear combination.

If the brake pedal is depressed, at 64, the system continues by ramping up the hydraulic pressure to engage the on-coming clutch, at 72. The disconnect clutch 20 is released, at 74, to disconnect the engine 12 from the motor 16 so that the energy from the regenerative braking system will be directed to the motor when the downshift is completed that, in turn, charges the battery 32. The downshift is completed, at 76, and regenerative braking is commenced, at 78.

Figure 5:
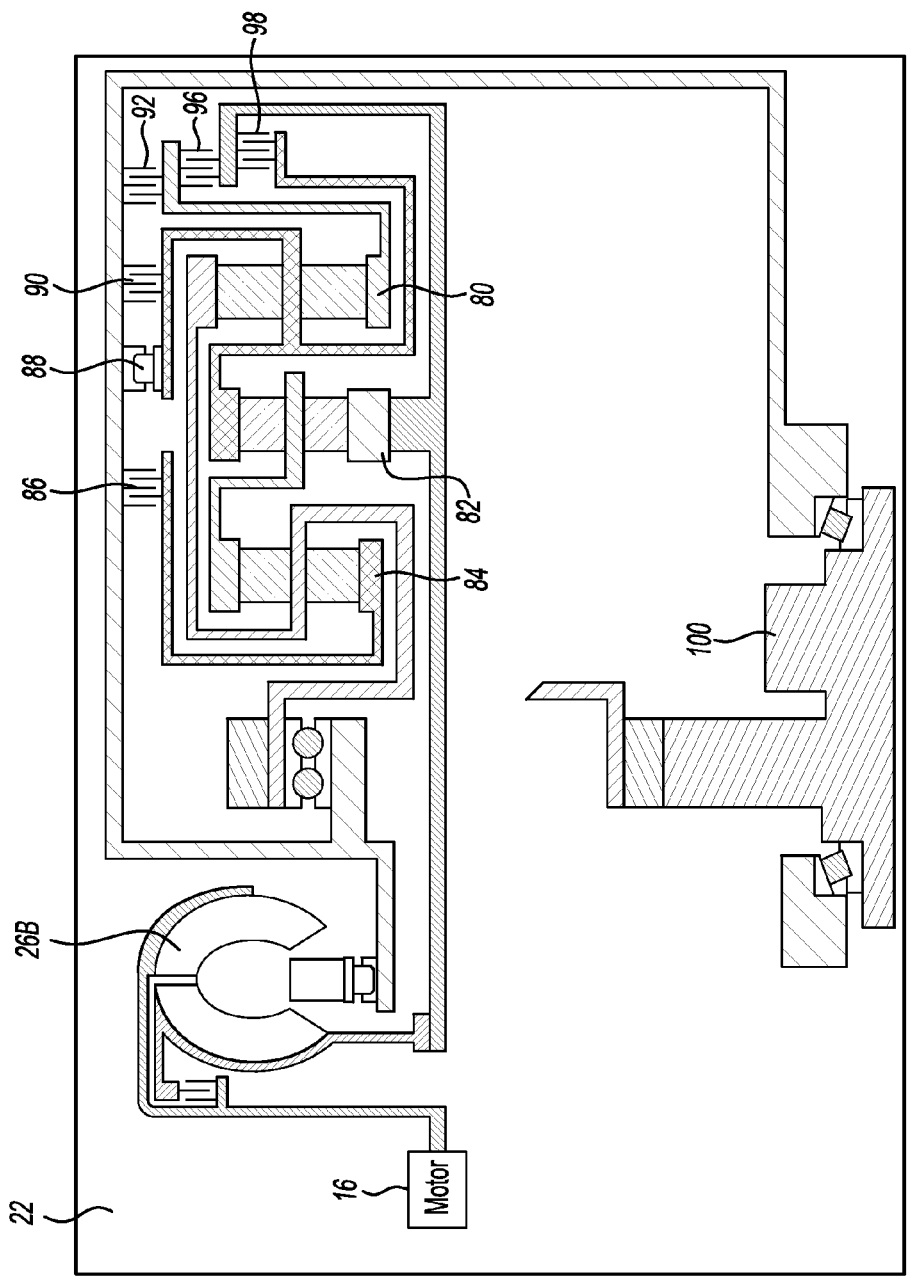
FIG. 5 is a diagrammatic representation of one example of an automatic transmission.

Referring to FIGS. 4 and 5, an example of a direct downshift is described with reference to the clutch element application chart and a diagram of an automatic transmission is provided. With specific reference to FIG. 5, the transmission 22 receives torque through the torque converter 26B from the motor 16. The transmission 22 has a first planetary gear set 80, and second planetary gear set 82, and a third planetary gear set 84. Clutch brake (CB1234) is identified by reference numeral 86. One way clutch (OWC1) is identified by reference numeral 88. Clutch brake (CBLR) is referred to by reference numeral 90. Clutch brake (CB 26) is identified by reference numeral 92. Clutch (C35R) is identified by reference numeral 96. Clutch (C456) is identified by reference numeral 98 and the output to the ring gear is generally referred to by reference numeral 100.

A direct downshift, or synchronous downshift, is a down shift that can be achieved by changing a single element. In the six speed transmission that is illustrated, if the current gear is 6 the direct destination down shift gear may be 2. The $6^{th}$ gear requires applying clutch 98 (C456) and clutch brake 92 (CB26). A shift to $2^{nd}$ gear is achieved by applying clutch 86 (CB1234) and clutch brake 92 (CB 26). The $6^{th}$ gear to $2^{nd}$ gear shift requires releasing clutch 98 (C456) that is the off-going element and applying clutch 86 (CB1234) that is the on-coming element. In this case, clutch 86 (CB1234) is commanded to go through boosting and stroking after the accelerator pedal 34 (shown in FIG. 1B) is released before the brake pedal 36 (shown in FIG. 1B) is depressed. At the same time the pressure applied by the clutch of the off-going element clutch 98 (C456) could be reduced so that torque capacity is reduced but remains sufficient to maintain the current ratio. At this stage the transmission 22 does not change from the current ratio but is pre-staged for the downshift to $2^{nd}$ gear.

When the disconnect clutch 20 (shown in FIG. 1B) is commanded to open, the transmission 22 can proceed to complete the downshift to $2^{nd}$ gear. The brake pedal 36 may then be depressed to apply the brakes and regenerative braking can be initiated and can begin as soon as the downshift is completed. The duration of the downshift will be significantly less than it would be without pre-staging and more kinetic energy is recaptured by following this strategy.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a battery;
   a regenerative braking system;
   a transmission having a plurality of gears that are linked by a plurality of clutches that are each engaged and disengaged by a hydraulic cylinder; and
   a controller configured to boost and stroke the hydraulic cylinder of an on-coming clutch before a disconnect clutch is opened and the transmission is downshifted when a state-of-charge of the battery allows regenerative braking and a pedal is actuated.

2. The vehicle of claim 1 wherein the pedal is an accelerator pedal that is actuated by releasing the accelerator pedal.

3. The vehicle of claim 2 further comprising a brake pedal that is depressed to complete engagement of an on-coming downshift gear.

4. The vehicle of claim 1 wherein the controller is further configured to reduce hydraulic pressure provided to a hydraulic cylinder of an off-going clutch.

5. The vehicle of claim 1 wherein the controller is further configured to select a downshifted gear combination that is a direct shift from a current gear combination.

6. The vehicle of claim 5 wherein the transmission is further configured to complete the downshift after the pedal is actuated by releasing an accelerator pedal and when a brake is not applied and a desired gear combination is the same as the downshifted gear combination.

7. The vehicle of claim 5 wherein the controller is further configured to reduce a stroke pressure of an on-coming clutch and increase a stroke pressure of an off-going clutch to return to an original gear combination after the pedal is actuated by releasing an accelerator pedal when a brake is not applied and a desired gear combination does not require downshifting.

8. The vehicle of claim 5 wherein the controller is further configured to reduce a stroke pressure of an on-coming clutch, increase a stroke pressure of an off-going clutch, and boost and stroke an alternate gear combination to return to shift to the alternate gear combination after the pedal is actuated by releasing an accelerator pedal when a brake is not applied and a desired gear combination requires downshifting to the alternate gear combination.

9. A method of controlling a transmission of a vehicle having a battery, a regenerative braking system, a transmission having a plurality of gears that are linked by a plurality of clutches that are each engaged and disengaged by a hydraulic cylinder, and a controller, the method comprising:
   boosting and stroking the hydraulic cylinder of an on-coming clutch before a disconnect clutch is opened and the transmission is downshifted when a state-of-charge of the battery allows regenerative braking and in response to a pedal being actuated.

10. The method of claim 9 wherein the pedal is an accelerator pedal that is actuated by releasing the accelerator pedal.

11. The method of claim 9 further comprising reducing hydraulic pressure provided to a hydraulic cylinder of an off-going clutch.

12. The method of claim 9 further comprising selecting a downshifted gear combination that is a direct shift from a current gear combination.

13. The method of claim 12 further comprising completing the downshift after the pedal is actuated by releasing the pedal when a brake is not applied and a desired gear combination is the same as the downshifted gear combination.

14. The method of claim 12 further comprising reducing a stroke pressure of an on-coming clutch, increasing a stroke pressure of an off-going clutch, and returning to an original gear combination after the pedal is actuated by releasing the pedal when a brake is not applied and a desired gear combination does not require downshifting.

15. The method of claim 12 further comprising reducing a stroke pressure of an on-coming clutch, increasing a stroke pressure of an off-going clutch, boosting and stroking an alternate gear combination, and shifting to the alternate gear combination after the pedal is actuated by releasing the pedal when a brake is not applied and a desired gear combination requires a downshift to the alternate gear combination.

16. A system for downshifting a transmission comprising:
a battery;
a regenerative braking system;
a multi-step automatic transmission having a plurality of gears that are linked by a plurality of clutches that are each engaged and disengaged by a hydraulic cylinder; and
a controller configured to boost and stroke the hydraulic cylinder of an on-coming clutch before a disconnect clutch is opened and the transmission is downshifted when a state-of-charge of the battery allows regenerative braking and in response to a pedal being actuated.

17. The system of claim 16 wherein the pedal is an accelerator pedal that is actuated by releasing the accelerator pedal.

18. The system of claim 16 wherein the controller is further configured to select a downshifted gear combination that is a direct shift from a current gear combination.

* * * * *